United States Patent
Mogensen et al.

(10) Patent No.: US 6,349,951 B1
(45) Date of Patent: Feb. 26, 2002

(54) STACKABLE ROLLER CARRIAGE HAVING SWINGABLY MOUNTED WHEELS

(75) Inventors: Erling Kristen Mogensen; Erik Markvard Grubbe Nesting, both of Middelfart (DK)

(73) Assignee: Container Contralen A/S, Odense (DK)

( * ) Notice: Subject to any disclaimer, the term of this patent is extended or adjusted under 35 U.S.C. 154(b) by 0 days.

(21) Appl. No.: 09/381,368

(22) PCT Filed: Mar. 25, 1998

(86) PCT No.: PCT/DK98/00121

§ 371 Date: Nov. 1, 1999

§ 102(e) Date: Nov. 1, 1999

(87) PCT Pub. No.: WO98/42585

PCT Pub. Date: Oct. 1, 1998

(30) Foreign Application Priority Data

Mar. 26, 1997 (DK) .............................................. 0347/97

(51) Int. Cl.[7] .............................................. B65D 19/42
(52) U.S. Cl. .................................. 280/33.998; 280/79.11
(58) Field of Search ...................... 280/33.991, 33.998, 280/79.11, 79.3, 47.35, 47.34; 206/503, 509, 386

(56) References Cited

U.S. PATENT DOCUMENTS

| | | | |
|---|---|---|---|
| 3,415,532 A | * 12/1968 | Fingerut et al. | 280/34 |
| 3,523,694 A | * 8/1970 | Oliver | 280/33.99 |
| 4,250,593 A | * 2/1981 | Sachser | 16/45 |
| 5,445,396 A | * 8/1995 | Sebor | 280/33.998 |
| 5,662,343 A | * 9/1997 | Mogensen et al. | 280/79.11 |
| 5,711,540 A | * 1/1998 | Nesting | 280/33.998 |
| 5,823,549 A | * 10/1998 | Morgan, Jr. | 280/33.998 |
| 5,876,049 A | * 3/1999 | Spear et al. | 280/47.371 |
| 5,934,695 A | * 8/1999 | Rowland | 280/33.998 |

FOREIGN PATENT DOCUMENTS

| | | | |
|---|---|---|---|
| EP | 675 829 | 5/1996 | |
| GB | 2 280 166 | 1/1995 | |
| GB | 2281897 A | * 2/1995 | 280/33.998 |
| GB | 2 281 897 | 3/1995 | |

* cited by examiner

Primary Examiner—J. J. Swann
Assistant Examiner—J. Allen Shriver
(74) Attorney, Agent, or Firm—Merchant & Gould P.C.

(57) ABSTRACT

A rollercarriage having a carriage bottom below which a plurality of wheels (3, 5) is mounted, at least one of the wheels being mounted swingably about a substantially vertical swivel axis (7) which does not intersect the axis for the rotation of the wheel. The roller carriage is moreover provided with retention means to retain the at least one swingably mounted wheel (5) on an overlying roller carriage. The retention means comprise a support face (8) which supports the swingably mounted wheel at a support point (18), an outer engagement area (16) extending at least partly about the swivel axis (7), and an inner engagement area (16) positioned between the swivel axis (7) and the outer engagement are (16), said outer and inner engagement areas restricting the rolling movement of the at least one swingably mounted wheel (5) on an overlying roller carriage. At least one of the engagement areas is provided with at least one projection capable of engaging the swingably mounted wheel (5) on an overlying roller carriage, so that the rotation of the swingably mounted wheel about the support point (18) on the support face (8) is essentially prevented.

7 Claims, 4 Drawing Sheets

Figure 1:
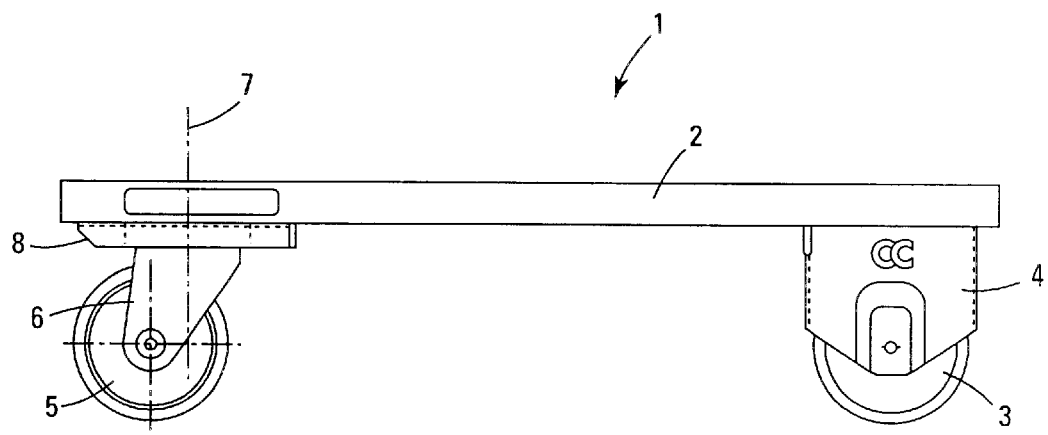

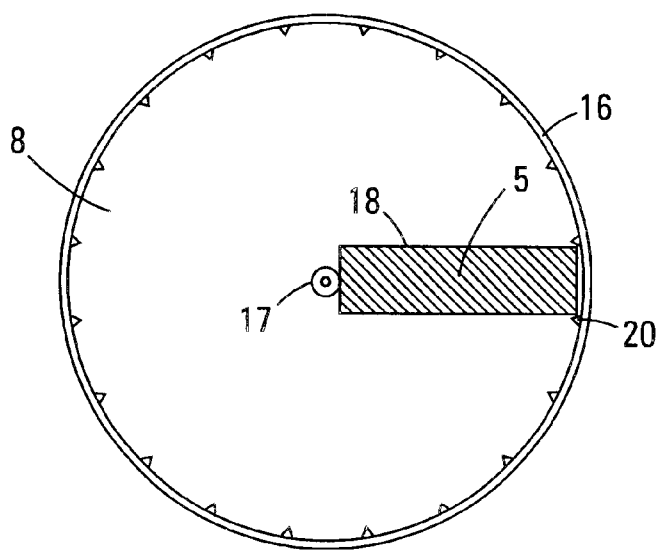
*Fig.* 5
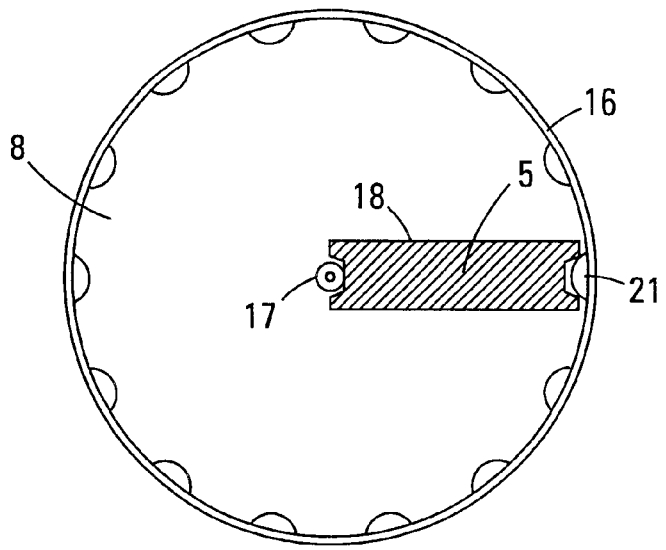
*Fig.* 6

STACKABLE ROLLER CARRIAGE HAVING SWINGABLY MOUNTED WHEELS

The invention relates to a roller carriage.

Such a roller carriage is known from EP B1 675 829, which discloses a roller carriage having a carriage bottom below which a plurality of wheels is mounted, at least one of these being swingably mounted about a vertical swivel axis. The upper side of the roller carriage is provided with means capable of retaining the wheels of an overlying roller carriage when several roller carriages are stacked. For the fixed wheels, these retention means are formed by rectangular recesses in which the fixed wheels can stand stably, while for each of the swingably mounted wheels they are formed by a completely or partly annular guide track with outer and inner engagement areas which retain the swingably mounted wheels against rotation.

Roller carriages of this type are usually used for the transport of goods in the distribution network from a wholesaler to retailers. The roller carriages are then transported back to the wholesaler in the empty state, it being a widespread wish that the roller carriages can be stacked so as to take up as little space as possible during transport.

The roller carriage described in the above-mentioned European patent solves a general problem of roller carriages having swingably mounted wheels, viz. that normally the wheels have to be aligned in specific directions in order to be retained in recesses provided in the upper side of the underlying roller carriage. The stated solution allows the orientation of the swingably mounted wheels to be quite arbitrary, while still providing satisfactory retention of the wheels.

However, in particular for the roller carriages in which the stated guide track is formed by a bracket plate, it has been found that a stack of many roller carriages, e.g. as many as 20, may be unstable in spite of the good retention against rotation of the swingably mounted wheels, it being possible for the swingably mounted wheels to rotate slightly about the point where they stand on the bracket plate. The effect of this is the greater, the more roller carriages are stacked on top of each other, and the greater the risk is for the persons working with the roller carriages.

The object of the present invention is to provide a solution in which this instability is avoided.

This is achieved by constructing a roller carriage having a bottom frame, with a plurality of wheels on its lower surface, at least one of the wheels being swingably mounted so as to swing about a substantially vertical swivel axis that does not intersect an axis of rotation of the wheel. The bottom frame also has retention means on its upper surface to retain at least one swingable wheel of an overlying roller carriage. The retention means include a support face for supporting the wheel of the overlying roller carriage at a support point that is positioned on a circular arc concentric with the swivel axis of the wheel. The retention means also includes an outer engagement area extending at least partly around the swivel axis of the wheel, and an inner engagement area disposed between the swivel axis of the wheel and the outer engagement area. The outer and inner engagement areas cooperate to restrict rolling movement of the swingable wheel of the overlying roller carriage in a direction transverse to the axis of rotation of the of the wheel. In addition, at least one of the inner and outer engagement areas is provided with at least one projection adapted to engage the wheel, the projection being adapted to absorb forces in parallel with the axis of rotation of the wheel at a radial distance from the support point such that swinging of the wheel about the support point on the support face is essentially prevented for substantially any angular orientation of the wheel with respect to the projection.

This provides a roller carriage which supports each of the swingably mounted wheels on an overlying roller carriage at at least two points, viz. at the point on the rolling face of the wheel which stands on the support face of the bracket plate, and at a point along the inner and/or outer engagement areas. Hereby, increased retention of the swingably mounted wheels against rotation about the swivel axis is obtained.

As a result of this increased retention, a quite stable stack of roller carriages can be obtained.

When the outer and inner engagement areas are arranged along concentric circles a particularly effective retention is obtained, as these can hereby normally support the swingably mounted wheels quite optimally against rotation in their rolling direction entirely independently of the angular orientation of the wheel.

The projection or projections which are to retain a swingably mounted wheel, may either be provided in connection with the inner engagement area or in connection with the outer engagement area.

The projection preferably consists of a pin or the like in connection with the inner engagement area, capable of engaging a groove which is provided in the rolling face of the swingably mounted wheel.

Alternatively, or as a supplement, several projections may be arranged in connection with the outer engagement area, and these are preferably arranged so that their mutual distance either corresponds to the width of the wheel, or so that they can engage an annular groove provided in the rolling face of the wheel.

Figure 2:
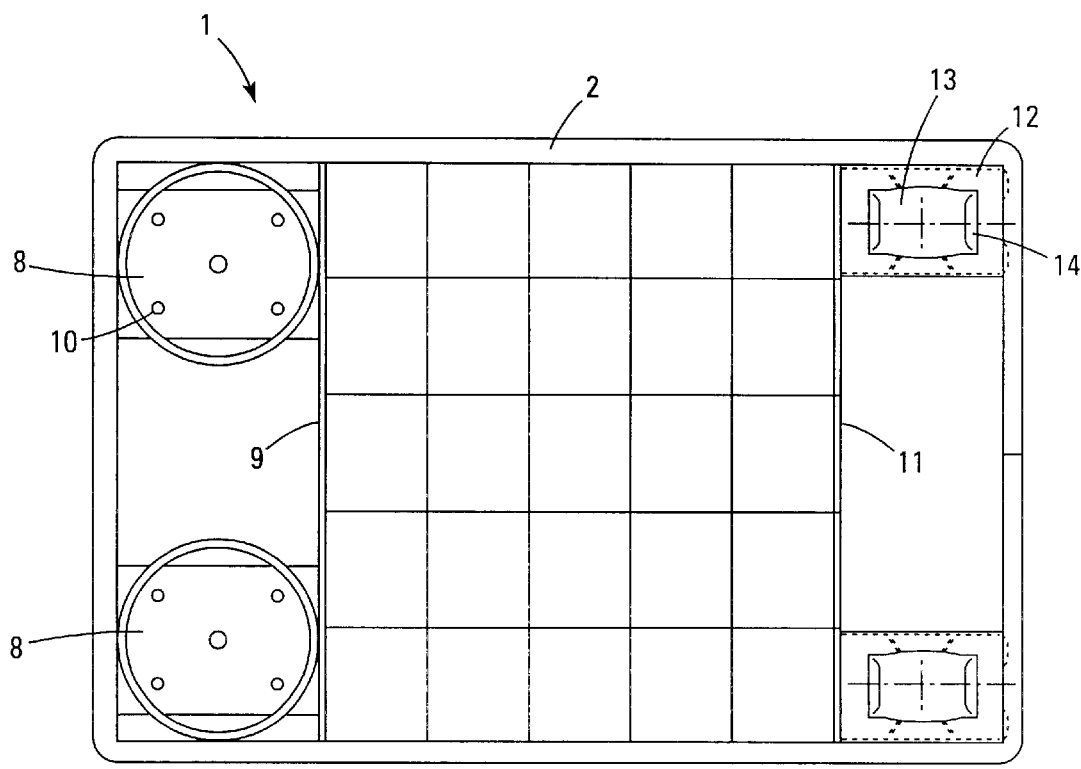
Figure 3:
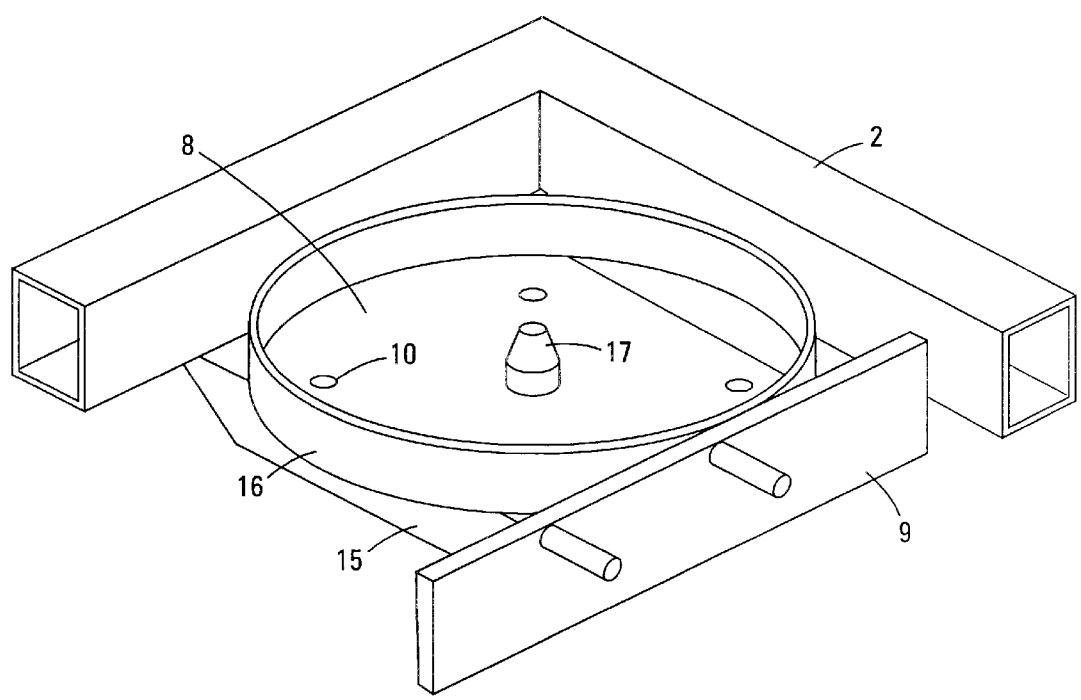
Figure 4:
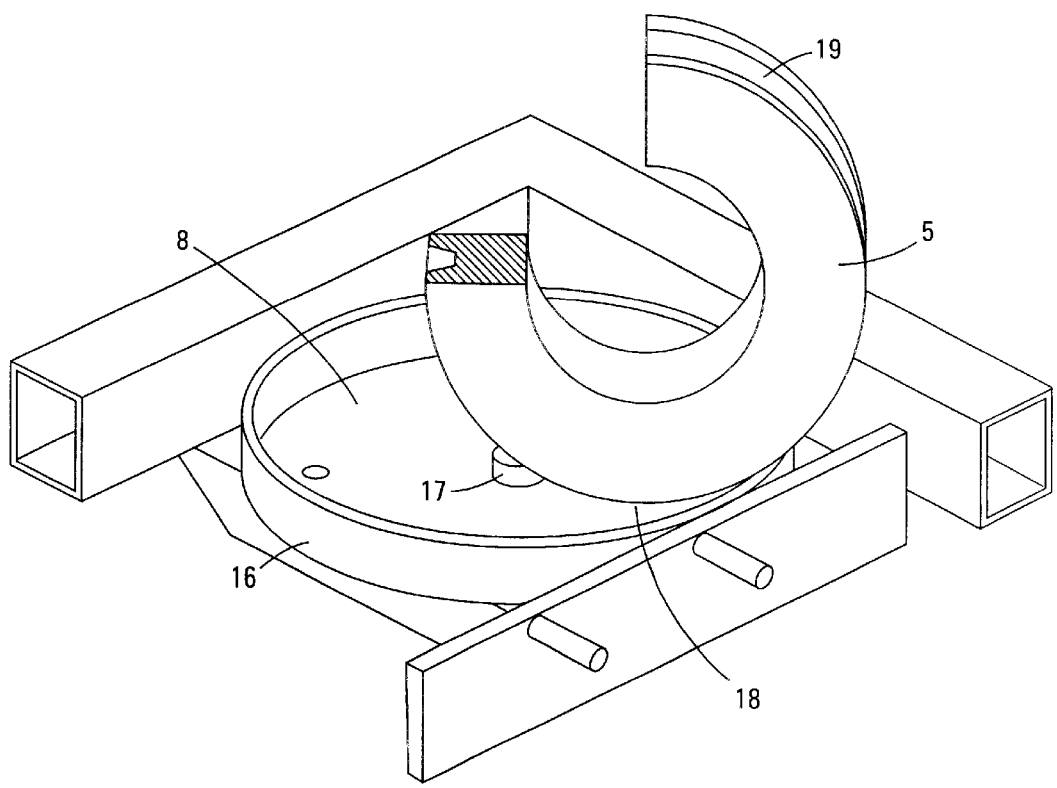

The invention will now be explained more fully with reference to the drawing, in which FIG. 1 is a lateral view of a roller carriage according to the invention, FIG. 2 is a top view of a roller carriage according to the invention, FIG. 3 shows a corner of the roller carriage shown in FIG. 1, FIG. 4 shows the same as FIG. 2, but with a wheel having an annular groove arranged thereon, FIGS. 5 and 6 show alternative embodiments of the invention.

FIG. 1 shows a roller carriage 1 from the side. The roller carriage 1 comprises a bottom frame 2 below which two fixedly oriented, freely revolving wheels 3 are mounted by means of forks 4 secured to the bottom frame 2 by welding or bolting. The roller carriage also has two swingably mounted wheels 5 arranged at the opposite end of the roller carriage 1. The swingably mounted wheels 5 are secured to wheel forks 6 which are swingably secured about a swivel axis 7 to a wheel bracket or support face 8. The support face 8 is welded to the bottom frame 2, as will appear from the following.

FIG. 2 is a top view of the roller carriage 1 of FIG. 1, and it will be seen that the bottom frame 2 comprises an outer rectangular frame consisting of two long sides and two end sides. This outer frame is made of a bent pipe profile welded together at the ends. A transom 9 is secured between the long sides of the outer frame, which transom partly imparts rigidity to the roller carriage and partly serves as an attachment part for the support faces 8. The support faces 8 consist of a plate-shaped material which is welded to the transom 9 and the end side of the roller carriage, respectively. In the embodiment shown, the swingably mounted wheels 5 are mounted on the underside of the support face 8 by means of bolts which extend through four holes 10 in the support face.

The bottom frame 2 additionally comprises a transom 11, which likewise imparts rigidity to the bottom frame 2, but also serves as an attachment part for the fixedly oriented wheels 3.

A grating is arranged between the two transoms 9 and 11, said grating being welded to the transoms 9, 11 and the long sides of the bottom frame 2. The grating also imparts rigidity to the bottom frame 2 and simultaneously serves as an access restriction to the interior of the roller carriage 1, but is otherwise without importance to the invention as such.

Brackets 12, which may be an integral part of the wheel forks 4 for the fixedly oriented wheels 3 or form an attachment part for these, are secured at the corners at one end of the roller carriage 1 between the end side of the bottom frame 2 and the transom 11. The brackets 12 are provided with a recess 13 whose ends are provided with support faces 14 for the fixedly oriented wheels 3 of a roller carriage arranged on top of the roller carriage 1.

As mentioned, support faces 8, whose structure will be described more fully below with reference to FIG. 3, are arranged at the other end of the bottom frame 2.

FIG. 3 shows an enlarged view of one of the corners of the roller carriage 1, and the long side and the end side of the bottom frame 2, the support face 8, the transom 9 and the ends of the rods for the grating are clearly visible.

As mentioned before, the support face 8 is welded to the end side of the bottom frame 2 and the transom 9 and is moreover provided with holes 10 for mounting of a swingably mounted wheel 5, which, however, is not shown in FIG. 3. The sides 15 of the support face 8 are bent downwards to provide additional strength and rigidity against deflection.

The upper side of the support face 8 has mounted thereon an outer engagement area 16 in the form of a ring made of bent flat iron, and an inner engagement area 17 in the form of an upwardly protruding pin. Both engagement areas are welded to the support face 8.

The effect of these outer and inner engagement areas 16, 17 is to retain an arbitrarily oriented, swingably mounted wheel 5 on an overlying roller carriage, as described in EP B1 675 829.

According to the present invention, the inner engagement area, in the preferred embodiment shown, is formed such that it can engage a swingably mounted wheel 5 on an overlying roller carriage. The reason is that the inner engagement are 17 is formed as a pin whose upper Dart is conically inclined, and whose shape fits an annular groove which is provided in the rolling face of the swingably mounted wheel 5. This is shown more fully in FIG. 4, which substantially corresponds to FIG. 3, but with a swingably mounted wheel 5 from an overlying roller carriage.

The wheel 5, from which a portion has been removed to show its cross-section, stands on the support face 8 at the support point 18 and is retained against rotation by the outer and inner engagement areas 16 and 17. In addition, the inner engagement area 17 in the form of a pin engages an annular groove 19 which is provided in the rolling face of the wheel 5. This engagement between the pin and the wheel 5 prevents the wheel 5 from rotating about the support point 18. This results in a more stable stacking than can be obtained with the roller carriage according to EP B1 675 829, which reduces the risk of personal injury when working with many roller carriages stacked on top of each other.

In order to fit the upper conical part of the pin the groove 19 is formed with inclined sides. This shape of the groove 19 moreover has the advantage that dirt and soil do not easily stick in the groove if the roller carriage is used on a dirty substrate.

In the shown embodiment, the outer engagement area 16 consists of bent flat iron, but it may be constructed in many other ways, e.g. as a ring of wire material as shown in EP B1 675 829.

FIGS. 5 and 6 schematically show two other embodiments of the invention, where the outer engagement area 16 is arranged to engage the swingably mounted wheel 5 on an overlying roller carriage.

In FIG. 5, the outer engagement area 16 is shown with a plurality of projections 20, whose mutual distance corresponds to the width of the wheel 5. In this embodiment, the wheel 5 does not have to provided with an annular groove, which means that conventional wheels may be used.

Also FIG. 6 shows a number of projections 21 provided on the outer engagement area 16. These projections are shaped so as to mate with an annular groove provided in the rolling face of the wheel 5. The inner engagement area 17 consists of a pin, as shown in FIGS. 3 and 4. Thus, in this embodiment, both the outer and the inner engagement areas engage the wheel 5 on an overlying roller carriage.

The mutual distance between the projections 21 corresponds to the width of the wheel 5 in the embodiment shown in FIG. 6, so that the wheel 5 can also be retained between the projections 21 in the same manner as shown in FIG. 5.

To ensure correct positioning of the wheel 5, the projections 20 and 21 shown in FIGS. 5 and 6 must be formed such that the wheel 5 is guided down to a correct position either between the projections 20 or with the groove around one of the projections 21. This may be obtained by making the projections 20, 21 pointed upwardly, so that their side faces serve as guide faces for the wheel 5.

The invention has been described in the foregoing with reference to a roller carriage which is welded together of steel profiles/plates.

However, nothing prevents the invention from also being worked in connection with other types of roller carriages, e.g. roller carriages made of plastics. The invention can also be worked using a combination of steel and plastics, e.g. in that the bottom frame of the roller carriage, as such, is made of welded steel profiles, while the inner and outer engagement areas are made of plastics which are subsequently mounted on the bottom frame.

Nor do the inner and outer engagement areas have to extend over 360° either, like in the preferred embodiment, but may e.g. extend over 270° or less, if so desired.

What is claimed is:

1. A roller carriage comprising:
    a bottom frame having an upper and a lower surface, said bottom frame comprising a plurality of rotatable wheels disposed on said lower surface, at least one of said wheels being swingable about a substantially vertical swivel axis that does not intersect an axis of rotation of said at least one wheel, and
    retention means disposed on said upper surface, said retention means being adapted to retain at least one swingable wheel of an overlying roller carriage, said retention means comprising a support face adapted to support the at least one swingable wheel of the overlying roller carriage at a support point said support point being positioned on a circular arc concentric with a swivel axis of the at least one swingable wheel of the overlying roller carriage, said retention means further comprising an outer engagement area extending at least partly around the swivel axis of the at least one swingable wheel of the overlying roller carriage outside said circular arc, and an inner engagement area disposed inside said circular arc, wherein said outer and inner engagement areas cooperate to restrict a rolling movement of the at least one swingable wheel of the overlying roller carriage in a direction transversely to an axis of rotation of the of the at least one swingable wheel of the overlying roller carriage, at least one of said inner and outer engagement areas is provided with at least one projection adapted to engage the at least one swingable wheel of the overlying roller carriage, said projection being adapted to absorb forces in parallel with the axis of rotation of the at least one swingable wheel of the overlying roller carriage at a radial distance from said support point such that a swing of the at least one swingable wheel of the overlying roller carriage about the support point on the support face is essentially prevented for substantially any angular orientation of the wheel on said support point with respect to said at least one projection, and all of said at least one projection that are provided on said inner engagement areas are inside said circular arc, and all of said at least one projection that are provided on said outer engagement area are outside said circular arc.

2. A roller carriage according to claim 1, wherein said at least one projection is proximate the swivel axis of the at least one swingable wheel of the overlying roller carriage.

3. A roller carriage according to claim 1, wherein said at least one swingable wheel defines an annular groove in a rolling face thereof, and wherein said least one projection is disposed on said inner engagement area, and wherein said at least one projection is adapted to engage an annular groove in a rolling face of the at least one swingable wheel of the overlying roller carriage.

4. A roller carriage according to claim 2, wherein said at least one projection comprises an upwardly protruding pin.

5. A roller carriage according to claim 4, wherein said pin is a rotation-symmetrical pin comprising an upper end that is inclined conically inwards.

6. A roller carriage according to claim 1, wherein said outer engagement area comprises a plurality of projections, wherein adjacent projections are spaced from one another by a distance that substantially corresponds to a width of the at least one swingable wheel of the overlying roller carriage.

7. A roller carriage according to claim 1, wherein said at least one swingable wheel defines an annular groove in a rolling face thereof, and wherein said outer engagement area comprises a plurality of projections adapted to engage an annular groove a rolling face of the at least one swingable wheel of the overlying roller carriage.

* * * * *